(12) United States Patent
Joyce et al.

(10) Patent No.: US 8,234,648 B1
(45) Date of Patent: Jul. 31, 2012

(54) MANAGING THREADS IN DISPLAYING DATA STORAGE SYSTEM INFORMATION

(75) Inventors: Scott E. Joyce, Foxborough, MA (US); Anirudh Takkallapally, Natick, MA (US); Vidhi Bhardwaj, Milford, MA (US); Sreenath Rajagopal, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 890 days.

(21) Appl. No.: 12/341,023

(22) Filed: Dec. 22, 2008

(51) Int. Cl.
*G06F 9/455* (2006.01)
*G06F 9/46* (2006.01)

(52) U.S. Cl. ......................................... 718/102
(58) Field of Classification Search ........................ None
See application file for complete search history.

(56) References Cited

U.S. PATENT DOCUMENTS

| | | | | |
|---|---|---|---|---|
| 6,081,665 | A * | 6/2000 | Nilsen et al. | 717/116 |
| 6,411,983 | B1 * | 6/2002 | Gallop | 718/104 |
| 6,523,168 | B1 * | 2/2003 | Arnold et al. | 717/116 |
| 7,140,018 | B1 * | 11/2006 | Beatty et al. | 718/102 |

* cited by examiner

*Primary Examiner* — Corey S Faherty
(74) *Attorney, Agent, or Firm* — Krishnendu Gupta; Jason A. Reyes; John T. Hurley

(57) ABSTRACT

A method is used in managing threads in displaying data storage system information. A thread is selected having a first method for executing a background task for interacting with a data storage system and a second method for use in updating a graphical user interface display based on a result of executing the background task. From a thread pool, another thread is selected for executing the background task.

20 Claims, 4 Drawing Sheets

MANAGING THREADS IN DISPLAYING DATA STORAGE SYSTEM INFORMATION

BACKGROUND

1. Field of the Invention

The present invention relates to managing threads in displaying data storage system information.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One example of this kind of graphical user interface includes a screen presentation that may include toolbars with accompanying menus and menu items as well as displays such as graphs, maps or trees.

In a display to which the term "tree" presentation or display is applied, one element in the tree is visually connected from another element in the tree somewhat reminiscent of a tree-branching, giving rise to the term. This display would be familiar to users of various commercially-available software packages, such as Microsoft's Windows Explorer® software. The element at treetop is normally called a "root node" or "parent" and elements connected directly below and from that root node are termed "children" of that root node. Children of that root node's children are "grandchildren" of the root node, etc., comprising the "descendents" of that root node. Any child node in the descendent hierarchy can be selected or considered as a "local root node" for its descendents. These displayed nodes, which are visible to computer users, are normally constructed within the computer system or network as software "objects" which are then handled or controlled by object-oriented software running in the system or network.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.). These tangible objects (nodes) within the storage processor in the storage system can send messages to each other within the storage system and to other objects outside the storage system over the network with which they are operatively coupled. The relationship between these specific objects in the storage processor is usually visualized or characterized as the tree to which reference was earlier made. In this tree, many children may typically hang from the same parent. In addition to these kinds of tangible objects, logical units (LUNs) are other nodes or objects that can be contained within a tree. Also, the storage processor itself and/or the storage system itself can be objects and interact as individual nodes, respectively, with other nodes in their network.

The tree relationship of these node objects may be displayed in tree fashion on the terminal screen of the GUI. This display is controlled, in part, by a large, fixed body of complex code which "paints" this tree display on the terminal screen.

With respect to the complex code, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object oriented programming language and a platform on which to run the Java applications. Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as an applet, it may first be sent over the network to the client machine.)

Java's objected orientated programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected orientated programming language objects communicate with each other by passing messages. Further object orientated concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

The use of multithreading is increasingly common in computing systems, including JVM based environments. Multi-threading allows for multiple tasks to be "active" on a computing platform simultaneously. The tasks can be any type of application, kernel, program, software module, etc., which may execute on the computing system. Multitasking can be truly simultaneous through the use of multiple processors and/or processing cores. Multitasking can result in execution of tasks in an apparently simultaneous manner to a user through the sharing or resource allocation of the computing resources in the computing system. In apparent or pseudo multitasking, the resources of the computing system are shared in a manner that it would generally appear to a user that multiple tasks are being executed simultaneously. The computing system generally switches very quickly (relative to a user's perceptions) between dedicating resources to the various tasks, and so appears to be executing each simultaneously.

Especially in JVM environments, multiple threads may be started or active. The group of active threads may be referred to as a thread pool. Management of a thread pool uses configuration settings in place in a system. For example, a system may be allowed to have a certain number (e.g., up to a configured maximum) of managed threads or threads that are open at a time in the system.

More particularly, in a typical multi-threaded system, multi-threading is implemented by first giving rise to a process space (e.g., by running an instance of a particular program, such as a web server program). Then, a plurality of threads, i.e., the thread pool, are allocated within that process space. In allocating the threads, each thread is given a unique thread ID. Once the process space is created and the thread pool is allocated, the system is ready to service requests.

When a request is received, the system determines whether the thread pool has an available thread. If so, then a thread is assigned to the request, and that thread is used to service the request. By servicing a request, it is meant that a set of code is executed to carry out the functions needed to satisfy the request. The execution of the set of code is carried out using the assigned thread. Multiple requests can be serviced concurrently; thus, if another request is received, then another thread is assigned to that other request, and that other thread is used to service the request. The two threads will execute independent of each other. As a result, the two requests can be serviced concurrently.

At some point, all of the execution that needs to be done to satisfy a request is completed. Once that point is reached, the thread assigned to the request is returned to the thread pool, and is thereafter free to be used to service another request. In the manner described, threads are assigned from the thread pool when needed, and threads are returned to the thread pool when servicing is completed.

The creation of Java GUIs is currently implemented with the Java Swing package. Previously, the Abstract Windows Toolkit (AWT) library was available for working with graphics. This package contains a simple set of classes such as Buttons, TextField, Label and others. A more advanced set of classes is contained in the later introduced library called Swing. Swing, like AWT, is a package that also includes buttons, text fields, and other classes for providing window controls.

A Java GUI uses a single event queue and processing thread (e.g., event dispatch thread) for the display. Event handlers detect any action that a user takes while operating a GUI. These actions include, but are not limited to, pressing a button, clicking a mouse, dragging or selecting a menu item, etc. Such actions will cause the JVM to handle (process) each singular event. As a result, no other event from the GUI is handled until processing of that single event is completed.

SwingWorker class is a ready-to-use Java class available from Sun Microsystems that can be implemented to keep the application usable while performing computing intensive GUI-related tasks. In particular, this class is an abstract class that can be subclassed to perform GUI-related work in a dedicated thread. For example, a SwingWorker object has a doInBackground method, executing in a time consuming worker thread, that produces an interim or final result and returns a reference to it. Subsequently, a "done" method, executing in the event dispatch thread, invokes "get" to retrieve this reference. In general this allows other GUI based operations and events to occur (e.g., thus allowing the GUI to be constructed) while the time consuming operation is done in the background. For example, this allows the GUI to start to be constructed before the time consuming work completes.

SUMMARY OF THE INVENTION

A method is used in managing threads in displaying data storage system information. A thread is selected having a first method for executing a background task for interacting with a data storage system and a second method for use in updating a graphical user interface display based on a result of executing the background task. From a thread pool, another thread is selected for executing the background task.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in managing threads in displaying data storage system information. In accordance with the technique, new functionality may be provided that, in at least one implementation, can effect a SwingWorker extension via a thread pool. The new functionality extends the functionality of the existing SwingWorker so that the worker thread (also referred to as the background thread) is obtained using a common thread pool instead of generating a new thread for each instance. Thus, for example, in situations in which it is necessary to have a long running task run in a background thread and provide updates to the GUI either when done, or while processing, the background thread may be obtained from the common thread pool. In at least one implementation, the common thread pool is used throughout the application for obtaining threads. This common thread pool may be advantageous for any of multiple reasons: (1) performance gains by reuse of threads, (2) ease of tracking threads and the number of threads running, which also aids debugging, and (3) control of the maximum number of threads being used by the application. In particular, the technique helps provide the capability to funnel all thread creation through the common thread pool.

Figure 1:
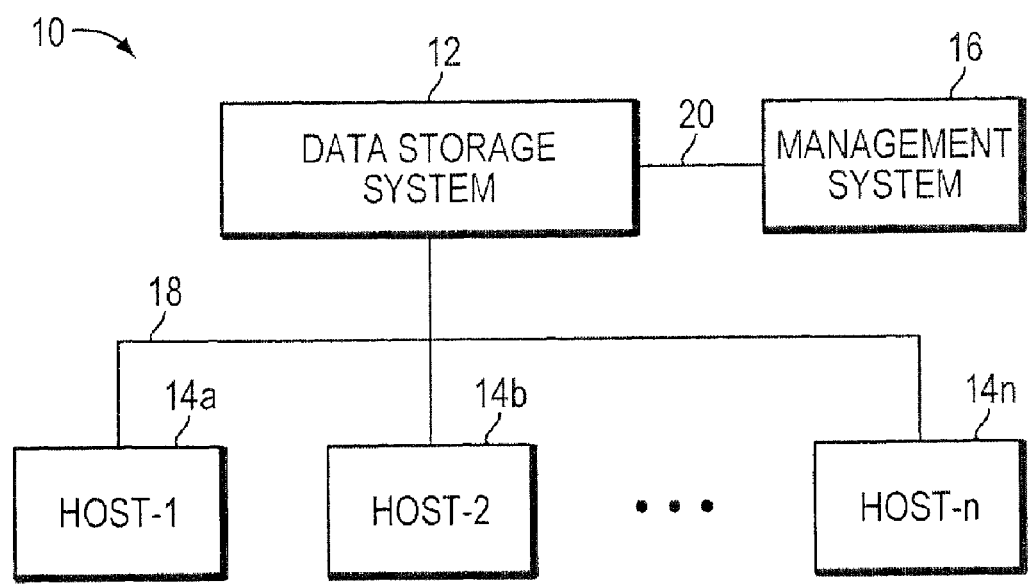
FIGS. 1-4 are block diagrams of at least part of a system that may be used in managing threads.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
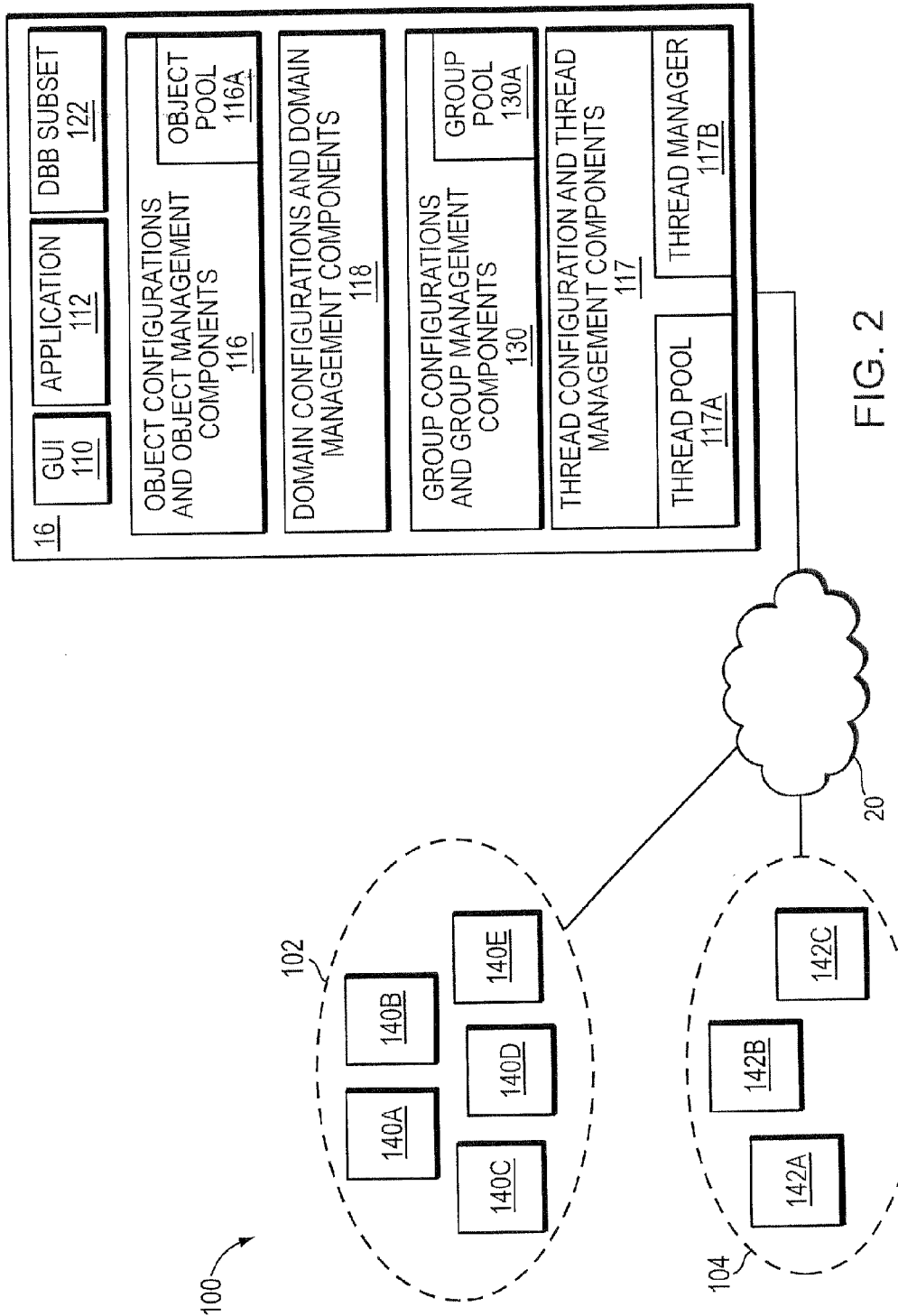

Referring now to FIG. 2, shown is an example 100 of components that may be used in connection with the technique described herein. Included in the example 100 are domains 102 and 104, components that may be included in the management system 16, and communication connection 20. A domain may be defined as a functionally bounded set of interconnected components, such as data storage systems, that communicate and/or cooperate for a common purpose. The particular data storage systems included in a domain may be user-configured. A user may want to perform operations for data storage system management at the domain level (e.g., for the data storage systems included in a domain). Thus, a user may accordingly configure one or more domains. In this example, two domains 102 and 104 are specified although an embodiment may include a varying number of one or more domains. Each of the domains 102 and 104 may be configured to include one or more data storage systems. The domain 102 includes data storage systems 140a-140e. The domain 104 includes data storage system 142a-142c. It should be noted that in one embodiment, the same storage system may not belong to more than a single domain at any particular time.

The components of the management system 16 may include a graphical user interface (GUI) 110, one or more applications 112, object configurations and object management components 116, domain configurations and domain management components 118, a directory database (DDB) subset 122, group configurations and group management components 130, and thread management configurations and components 117.

The GUI 110, e.g., a Java applet making network calls to a management interface in data storage systems 12, may be used in connection with interfacing with a user, such as a data storage system manager. The GUI 110 may be used to obtain input in connection with inquiries to be made regarding one or more domains. The GUI 110 may also be used in connection with displaying output, for example, in response to obtaining information for requested inquiries regarding the one or more domains. The GUI 110 may be used in connection with one or more applications 112 for performing system management of the data storage systems included in domains 102 and 104.

The domain configuration and domain management components 118 may be used in connection with storing information about what nodes are included in each configured domain. If changes are made to a domain configuration such as, for example, in connection with the addition and/or removal of a data storage system, domain management components may accordingly update the configuration of the affected domain(s). One embodiment of a domain and supporting components as may be included in the management system 16 is described in more detail in U.S. patent application Ser. No. 10/242,521, entitled "ROBUST INDICATION PROCESSING FAILURE MODE HANDLING", filed on Sep. 12, 2002, assigned to EMC Corporation, which is incorporated by reference herein. It should be noted that the foregoing embodiment includes components and describes processing as may be included in a system specifying a failover processor for a data storage system. In the foregoing application incorporated by reference, each data storage system includes multiple processors forming a cluster. Only one of the processors is designated as active at any time. The foregoing application further describes maintaining communication with a designated active one of the cluster's processors and designating another of the cluster's processors in the event an active processor fails or is otherwise not available for use. It will be appreciated by those skilled in the art that the technique may also be used in connection with an embodiment that does not include distributed information roll-up or the foregoing failover functionality and/or does not utilize a node having multiple processors.

The object configurations and object management components 116 may be used in connection with management of objects associated with the data storage systems of domains 102 and 104. As described herein, an object may refer to an entity commonly used in connection with object oriented programming. An embodiment of an object may be defined as a data container including data and/or instructions to be used in connection with accessing a particular object. An object may be associated with an entity in a domain for monitoring or observing a component such as in connection with the management of data storage systems. An object may represent a real-world entity such as a hardware or software entity. Examples of such hardware or software entities may be, for example, an application executing on a server, a LUN, disk, port, fan, and the like. The entity may be a physically or a logically defined entity as may be included in a node of the domain.

The element 116 may include an object pool 116a representing a subset of all objects that may be defined for a given system, such as illustrated herein. The contents of the object pool may vary in accordance with the particular operations being performed by the GUI 110. Information about each of the objects may be stored on each node for which the object is defined. In other words, each node includes information about its own objects. The particular subset of objects included in the object pool may vary in accordance with the operation performed via the GUI since the object pool is used in facilitating GUI operations. For example, if the user is performing an operation to view objects defined for a first data storage system, the object pool may include that subset of objects defined for the first data storage system. If the user subsequently views objects defined for a second different data storage system, the object pool may be updated to include a different subset of objects defined for the second data storage system.

The element 116 may represent collectively the components for maintaining and management of the object pool 116a. The object management components included in 116 may handle management of the foregoing object pool including, for example, retrieving updated information about which objects are defined for a node at the time of a user selection. The components in 116 may retrieve such information and maintain the lists of objects defined for each node using any one or more different ways. In one embodiment, an inquiry may be sent to each node requesting a list of all objects when needed such as, for example, when the user is defining groups and requests a list of objects defined for a particular node.

Thread configurations and thread management components 117 may include thread pool 117a and thread manager 117b as described in detail below.

Group configurations and group management components 130 may be used in connection with defined groups of objects. In one embodiment, groups may include user-configured groups. A user, such as a data storage system manager, may associate one or more objects with a particular group. During operation of a system, the user may also update or reconfigure the defined groups. In connection with the GUI, a group may be displayed as, for example, a folder. Objects included in a group may span one or more physical data storage systems included in a domain. For example, a group may be defined for all LUNs. A group may also be defined for a subset of a particular resource, such as a portion of devices or volumes including critical data as may be used by a particular application or for a specific business function or purpose. A group may also include objects associated with different types of resources. For example, a group may be defined to include all objects associated with a particular data storage system. The objects may include all ports, LUNS, applications, and the like.

The group may be defined to recursively include a subset of objects within a domain. In one embodiment, a group may also be defined to include other groups. In other words, an element of a first group may be a second group or an object. The particular objects included in the first group may be defined by repeatedly determining all the objects in each nested group, such as the second group. It should be noted that an embodiment may allow for a group nesting of a predetermined depth or number of levels. The value may be user configurable in an embodiment.

The element 130 may include a group pool 130a representing a subset of all possible group information for all groups defined in a given system such as 10. As with the particular subset of objects included in the foregoing object pool, the particular subset of group information included in 130a varies in accordance with the particular operation performed by the GUI 110. Element 130 may also collectively represent components used in connection with management and maintenance of the group pool 130a.

In one embodiment, a user may select which objects on a particular data storage systems are included in a particular group. Group definitions may be made, for example, using the GUI 110 by repeatedly selecting from displayed objects defined for different nodes. Tables or lists of objects defined for each node as used by the GUI may be stored in the object pool 116a during the foregoing displaying and selecting process for defining a group.

The DDB subset 122, as included in the management system 16, may be used in connection with facilitating communication between elements in the domain. The DDB subset 122 may be a subset of the entire persistent DDB as may be stored on each node of the domains. As illustrated in connection with other figures herein, the DDB may be distributed throughout the entire network and included in each node of the domain. The DDB may be characterized as a generic directory of persistently stored data which is maintained and recoverable, for example, in the event of a power failure. Each node included in the domain may have an address or associated entry in the DDB. A first node wishing to communicate with another node in the domain may obtain the address layout or other information in order to communicate with the other node from the DDB. The DDB may be viewed as a database of address listings for entities in an embodiment. The particular entities listed may vary with each embodiment but may include address information for all nodes in a domain. Addresses may also be included in the DDB for other entities as may be included and used in an embodiment. In one embodiment, all nodes may mount a shared drive accessing a file or other data container including a common set of directory information as may be held in a single central location. Another embodiment of the DDB is described in U.S. patent application Ser. No. 09/965,430, filed Sep. 27, 2001, entitled "MANAGING A DISTRIBUTED DATABASE CACHE", which is incorporated by reference herein. As will be appreciated by those skilled in the art, other embodiments of a DDB may be used. The DDB may be used in facilitating gathering of information using distributed information rollup.

The particular subset of the DDB 122 included in 16 may vary in accordance with the particular operations performed by the GUI 110 since the element 122, along with 116a and 130a, may be used to facilitate GUI operations.

The data storage systems included in the domains 102 and 104 may be, for example, data storage systems as manufactured by a single vendor such as EMC Corporation. An embodiment may also include data storage systems from multiple vendors. These, and other particulars described herein for the purposes of example and illustration should not be construed as a limitation of the technique. The data storage systems included in the domains 102 and 104 and the management system 16 may communicate through the communication connection 20. In this example, the connection 20 may be a network connection although other types of connections may be used. The particular type of communication paths may vary in accordance with each embodiment. For example, the communication path used in connection with data storage management may also include a switching fabric. The types of connections used for data storage system management and/or I/O may include, for example, a fibre channel, SCSI, iSCSI or other communication connection.

It should be noted that the particular one or more components that may be included in the management system 16 may vary with each particular embodiment. As described elsewhere herein, the management system 16 may include, for example, a computer system which has a processor and a display device. The processor may execute instructions to display information about the storage system to a storage system manager. Software executing on the computer system of the management system 16 may also be used in connection with obtaining user input, such as may be obtained from the data storage system manager in connection with monitoring data storage systems.

The number and type of components included in management system 16 may vary with the complexity of the storage system as well as the particular applications and tasks performed in an embodiment. For example, management system 16 may include only a single computer system or processor with a single display device. Alternatively, an embodiment may require greater complexity in connection with management of the data storage system. Thus, the management system 16 may also include additional software and/or hardware Data storage system management may be used in connection with one or more data storage systems in an embodiment of the computer system 10 of FIG. 1.

In an example implementation, a user may manipulate, monitor and view data regarding groups of objects for a particular domain in connection with distributed information roll-up. Each node in a domain rolls up a partial view of requested information for objects of a particular group or groups included in, or defined on, that node. For each domain, a node may be designated as a central collector which communicates with the GUI in connection with processing a request. In this embodiment, this may be a request to gather information on one or more nodes in a domain in connection with management thereof. The central collector may be a node, such as a data storage system, included in the domain. In one embodiment, the central collector asks other nodes in the domain to determine partial views for objects included in one or more groups. These partial views are then reported back to the central collector for consolidation into a single report which is then communicated to the requestor, such as the GUI 110 in connection with a user request for information about objects in one or more groups. For example, a request may be made to provide the average throughout of I/Os associated with objects in a group. The central collector node receives the request and determines its partial view. The central collector determines the throughput of I/Os for objects in the particular group as included in the central collector. Additionally, the central collector node forwards the request on to other nodes to similarly determine their partial views of objects in the group. In other words, each of the other nodes also determines the throughput of I/Os for objects in the particular group as included in, or defined on, each node. The information is returned to the central collector which then consolidates the received information. The central collector may also perform any additional computation needed. For example, with reference to the average throughput of I/Os, an average is desired. If all received information is the throughput of I/O's, the central collector takes the average of this. The central collector may receive as return information about each other node, for example, the total number of I/Os and the associated total number of objects. Using the foregoing information, the central collector may take the average and return this to the GUI. The central collector may dynamically make this request of all other nodes in the domain to determine and return the requested information.

The central collector may be selected, for example, by a user. An embodiment may also use other ways in connection with selection of a central collector. Such ways may include, for example, an executing process making a selection based on one or more heuristics.

In one embodiment, the central collector may utilize request forwarding in connection with distributed information roll-up. Request forwarding is described in detail in U.S. patent application Ser. No. 09/877,862, filed on Jun. 8, 2001, entitled SCALABLE COMMUNICATION WITHIN A DISTRIBUTED SYSTEM USING DYNAMIC COMMUNICATION TREES, which is incorporated by reference herein. Request forwarding utilizes a tree structure of the nodes in a domain in which the root of the tree may be the central collector. The central collector forwards the request down the tree toward the leaf nodes by instructing each node in the next level to similarly determine and report its own local view of objects in the requested group. If a node has nothing to add regarding the request (e.g., the node has nothing about the objects referenced in the request), the node may act as a conduit and further forward the request down to other nodes and similarly return information back up through its parent to the node originating the request. The central collector also requests each node in the next level to collect information from any of its child nodes and form a consolidated report of any collected information along with its own local view. This process of request forwarding is continued until the leaf nodes are reached. At this point, the leaf nodes determine their local views and report this information back up the tree to their respective parent node. The parent nodes collect the reported information from all their respective children (which includes information for all descendants of the child nodes) and form a consolidated report of this information and any local information from the parent node. The parent node then returns this consolidated information to its parent, and so on. The information is reported up the tree until the root node is reached. The tree is dynamic in that it may be determined at the time the information is being gathered. In response to a second request at a later time for the same information, a different tree may be determined.

Using the foregoing request forwarding, each node in the domain has connectivity to each other node in the domain. The respective addresses of nodes in the domain may be included and maintained in the DDB as illustrated in various figures herein. One embodiment for managing the DDB is described in more detail in U.S. patent application Ser. No. 09/965,430, filed on Sep. 27, 2001, entitled MANAGING A DISTRIBUTED DIRECTORY DATABASE, which is incorporated by reference herein.

In an embodiment in which each node in the domain has connectivity to every other node in the domain, any one of the nodes may be selected as the central collector node. In an embodiment, selection of the central collector node selection may be in accordance with the capabilities specific to each node. For instance, if one node is a low-end system with limited processing power, it may not have sufficient resource to function as a collector node.

In an embodiment in which the nodes in the domain do not have connectivity to other nodes, an alternate way may be used. The central collector node selected may have connectivity to each of the other nodes in the domain individually but the other nodes in the domain may not have connectivity to each other. In this instance, the central collector node may collect or gather the partial views of each other node in the domain. In one aspect, a tree of level 1 is used in which the collector is the root node and communicates directly with all the nodes in the domain as leaf nodes.

It should be noted that the central collector node may be a data storage system or it may be another computer system such as a personal computer. The data storage systems used in connection with the embodiment described herein include one or more processors that are used in executing code to perform the reporting and other processing described herein.

It should be noted that the groups of objects can be defined for any particular criteria. Examples may include groupings based on hardware characteristics, such as all disks meeting certain criteria, all LUNs, and the like. Queries or inquiries made with respect to the groups can be, for example, performance based to facilitate data storage system management.

Figure 3:
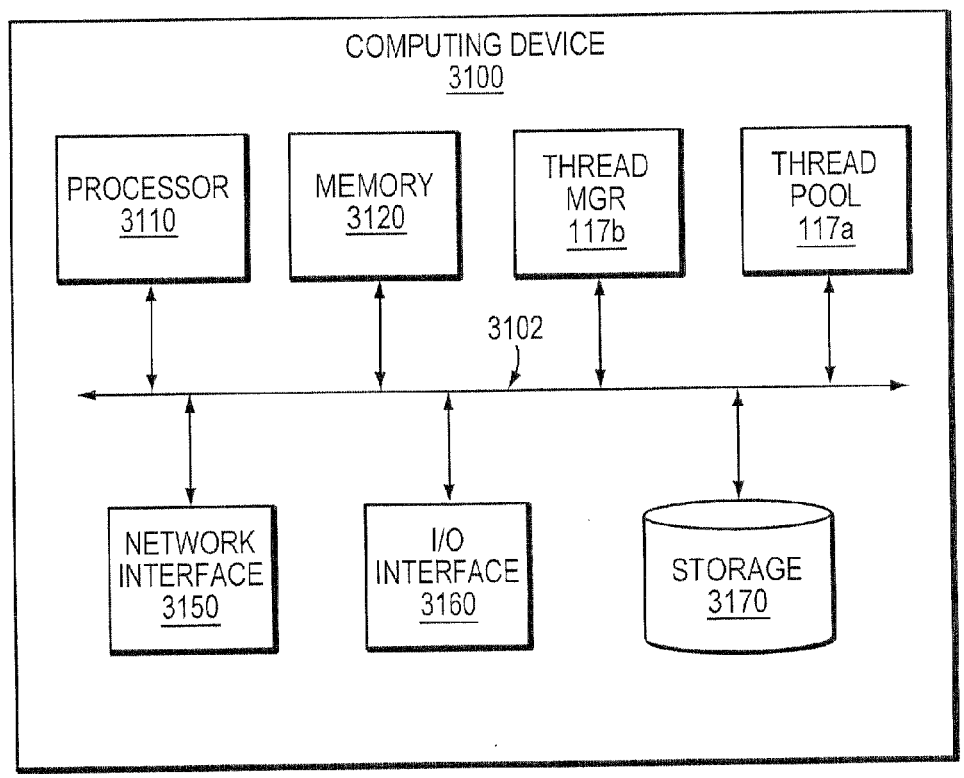

With reference now also to FIG. 3, system 16 includes thread management by thread manager 117*b* of thread related resources including thread pool 117*a*. The management of the thread pool may be based on various factors. System 16 may have one or more thread pool systems sharing the hardware. System 16 may be configured to have a certain maximum number of threads, such that the thread management can manage the thread pool to have up to the maximum number of threads.

In at least one embodiment, the thread manager monitors and collects performance and activity information for every thread. The performance data can be correlated with time information. The thread performance data can be kept for a period of time to generate historical thread performance data. Newly collected thread performance data may be combined with the historical thread performance to generate cumulative thread performance data, which indicates thread performance not just for currently executing threads, but also indicates thread performance trends. Combined with the time information, the thread performance trends over time can be monitored and predicted. Based on the thread performance data, the thread manager can adjust the number of threads within the pool that are active.

In at least one embodiment, threads are started on demand, or upon request, and added to the managed threads. In at least one embodiment, threads that are idle for a period of time are closed, which frees system resources. In at least one embodiment, threads can be closed or cut for inactivity in one of two ways: based on the thread achieving an idle period indicated in a configuration, and based on an idle period indicated by cumulative thread performance data. That is, a configuration may indicate that a thread should be closed if it has been inactive for a period of time. Also, historical data may indicate that if a thread has been inactive for a period of time, it is generally not needed in the system at that time. Thus, the thread manager can monitor the period of inactivity of a thread and determine whether to close the thread, based on either or both of a configuration time, and historical performance data.

FIG. 3 is a block diagram of an example embodiment of system 16 having thread pool manager 117b and thread pool 117a. Computing device 3100 may be, include, or be included in system 16 and represents any of a number of types of hardware resources on which a thread pool and accompanying thread pool manager may be hosted. Note that the hardware resources could be some or all of the resources of a physical machine. Not all resources need to be located on the same physical device. Computing device 3100 includes one or more processors 3110, which controls the operation of computing device 3100. Processor 3110 may include any type of microprocessor, central processing unit (CPU), or programmable general-purpose or special-purpose microprocessors. Computing device 3100 includes memory 3120, which represents the main memory of computing device 3100 to provide temporary storage for code or data to be executed by processor 3110. Memory 3120 may include read-only memory (ROM), flash memory, one or more varieties of random access memory (RAM, e.g., static RAM (SRAM), dynamic RAM (DRAM), synchronous DRAM (SDRAM), etc.), or a combination of memory technologies.

In the example embodiment, computing device 3100 includes thread pool 3140 and thread pool manager 3130 that manages thread pool 3140. In at least one implementation thread pool manager 3130 can be implemented as a software module executed on processor 3110 out of memory 3120. Hardware or special purpose integrated circuits or controllers could also be configured to implement thread pool manager 3130. Thread pool 3140 generally is considered to be included within memory 3120, although an implementation on a separate standalone device is possible. In at least one embodiment, thread pool 3140 is an object managing a list of started threads that can be executed by processor 3110. Thread pool manager 3130 can operate as a standalone component, or be a module within memory 3120. Thread pool manager 3130 can also be a sub-component of thread pool 3140, which manages the threads.

The various elements of computing device 3100 are coupled to bus system 3102. Bus system 3102 is an abstraction that represents any one or more separate physical buses, communication lines/interfaces, and/or multi-drop or point-to-point connections, connected by appropriate bridges, adapters, and/or controllers Computing device 3100 may also include one or more network interface(s) 3150, one or more input/output (I/O) interface(s) 3160, and one or more storage device(s) 3170.

In at least one embodiment, network interface 3150 enables computing device 3100 to communicate with remote devices over a network, and may be, for example, an Ethernet adapter or other local area network (LAN) adapter. In at least one embodiment, I/O interface 3160 may include one or more interface components to connect computing device 3100 with other electronic equipment, for example, custom connections, blade adapters, etc. Additionally, computing device 3100 may accessible to a human user, and thus have video, audio, and/or alphanumeric interfaces through I/O interface 3160. Storage 3170 may be or include any conventional medium for storing data in a non-volatile manner. Storage 3170 may hold data and/or instructions in a persistent state (i.e., the value is retained despite interruption of power to computing device 3100).

The one or more network interface(s) 3150 and/or the one or more input/output (I/O) interface(s) 3160 may be, include, or be included in one or more of communication mediums 18, 20. The one or more storage device(s) 3170 may be, include, or be included in one or more of domains 102, 104 and/or data storage systems 140a-140e, 142a-142c.

Figure 4:
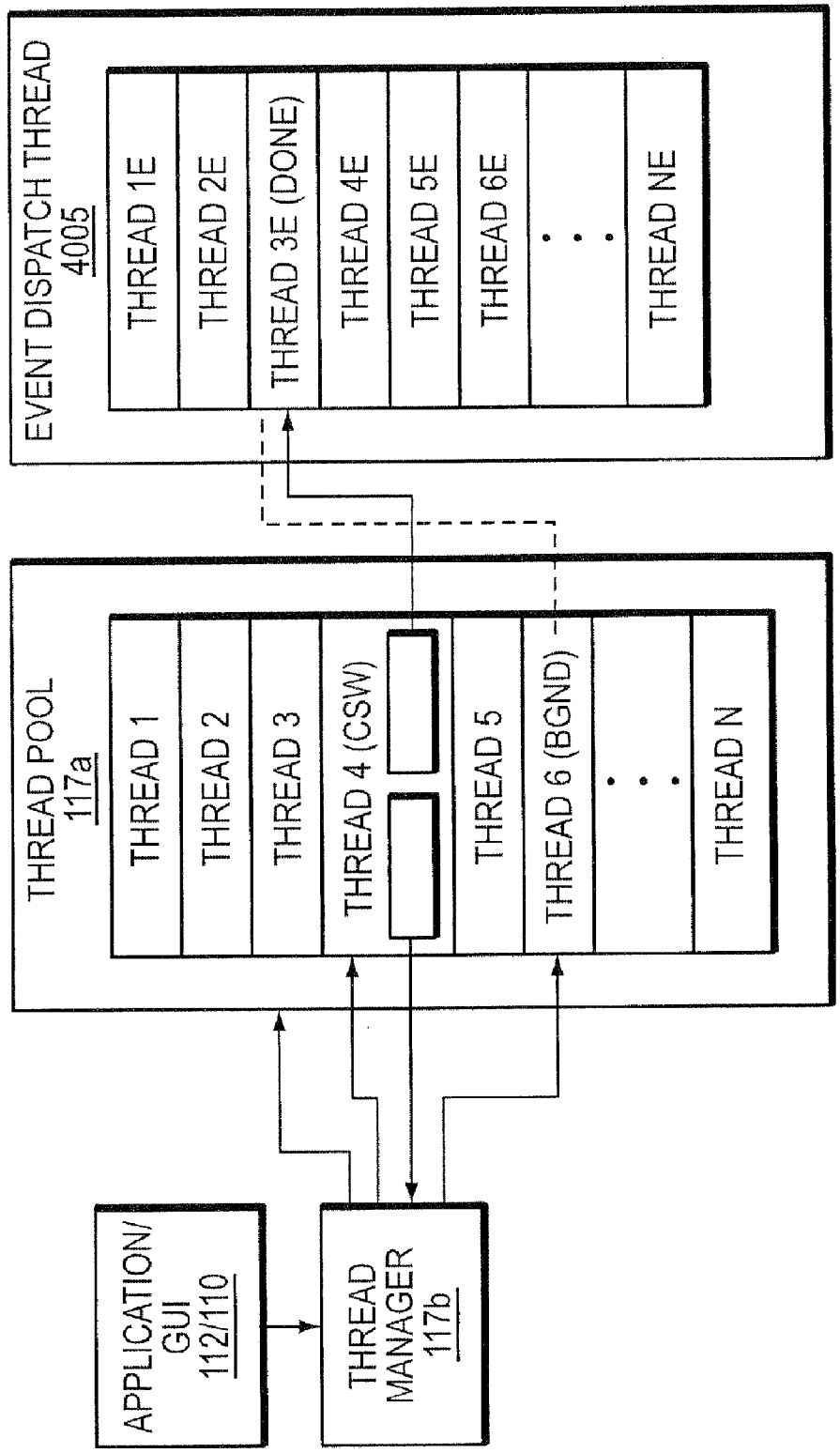

FIG. 4 is a block diagram of an embodiment of system 16 having thread manager 117b and thread pool 117a according to any embodiment described herein. Thread pool 117a provides a number of threads, thread 1 through thread N, which may be used to execute tasks in system 16. In at least one embodiment, each of threads 1 to N has any of three possible states: idle, running, or stopped. A running thread is a thread that currently has a task in some stage of execution. A stopped thread is a thread that finishes the processing required by its associated task(s). An idle thread is a thread that belongs to the pool, but currently has no active tasks. Thus, the thread is part of the thread pool that can be started at any time, without the need for allocating or provisioning the thread, because it already exists.

Thread manager 117b represents one or more components that provide management of thread pool 117a. In at least one embodiment, thread manager 117b is a thread within thread pool 117a. Alternatively, thread manager 117b could exist as a component in a separate memory or execution space, or could even be implemented from separate hardware, for example. Thread manager 117b includes various components which may be interfaces from an implementation of thread manager 117b to the components themselves. In at least one embodiment, thread manager 117b includes a memory which represents volatile storage for data and may also include storage which represents nonvolatile storage for data. Thread manager 117b generates and/or accesses various data items that are stored, including physical resource information, historical thread performance data, etc. Storing data in (nonvolatile) storage allows for the data to be persisted in the event of a power interruption, or a reset/restart.

In at least one embodiment, thread manager 117b includes a physical resource manager that enables thread manager 117b to determine what physical resources are available within system 16 for use by thread pool 117a. Such information can be obtained from an operating system, a platform hardware component (e.g., a basic input/output system (BIOS)), etc. The physical resource manager includes the necessary interfaces to obtain information about available system resources. The information can be stored in memory and/or storage. The physical resource manager can be considered a resource identifier that identifies the resources in the system. In at least one embodiment, the physical resource manager includes logic to determine configuration settings based on the physical resources identified. For example, the physical resource manager may configure a number of threads to initiate the thread pool, a maximum number of threads that can be part of the thread pool, etc.

Thread manager 117b may include any of a number of components or modules to enable thread manager 117b to perform functions related to management of thread pool 117a. For example, thread manager 117b may include a time signature module, an inactivity determiner, a thread activity module, and a thread performance accumulator. Certain implementations may include more or fewer components than those described. Also, in certain implementations, certain of the depicted components could be combined, while others could be separated in multiple components. Thus, thread manager 117b of FIGS. 3-4 is intended to be illustrative, and not restrictive of a thread manager.

The time signature module enables thread manager 117b to obtain timing information from threads of thread pool 117a. For example, thread pool 117a may be configured to have each thread indicate when the pool starts and stops execution. One simple method is to have a function call or a method that allows the threads to signal the beginning or ending of processing. The time signature module could then gather time signature information from system 16 to represent the time the indication was received. Such time information can be stored in memory and/or storage and possibly associated with the particular thread. Such information can inform an analysis about how long to expect a thread to execute, sit idle, etc.

The inactivity determiner enables thread manager 117b to determine how long a particular thread of thread pool 117a has been inactive. If a thread is inactive for a threshold period of time, the thread may be closed. The inactivity determiner may operate in conjunction with the time signature module. In at least one embodiment, the inactivity determiner includes a thread state module that determines a state of the threads (e.g., running, idle, stopped). The inactivity determiner may further determine whether a thread should be closed. The threshold inactivity level may be obtained from a configuration, historical data, or any combination of these.

The thread activity module enables thread manager 117b to determine a level of activity of the threads within thread pool 117a. In at least one embodiment, the thread activity module includes or is a thread state module that determines the state of threads. The thread activity module can provide information that is used in conjunction with historical performance data to determine how many threads to have in thread pool 117a. In at least one embodiment, the thread activity module includes a thread inactivity module, and can provide information regarding the activity or inactivity of threads in thread pool 117a.

The thread performance accumulator enables thread manager 117b to keep historical thread performance data. The thread performance accumulator may place data in memory and/or storage. In at least one embodiment, information is stored in an extensible markup language (XML) file. In another embodiment, information is stored in a JAVA object. In at least one embodiment, the information exists only in memory. Thus, thread manager 117b may exist (e.g., be instantiated) in memory, and the data exists and is used there. The data may include the historical thread performance data. The historical thread performance may include information about how many threads are open, when, how many are active, how many are idle, how often requests for threads are received, how long threads sit idle before being requested, etc. Such information can be obtained and interpreted in conjunction with a statistics engine. Other information is possible. Note that information could be analyzed and inform the system about expected use patterns. The use can specify historical usage for days of the month or days of the week or days of the year. Granularity can be changed from one implementation to the next, and depends upon the application of the system. Even within an enterprise, different systems may use different granularity, depending on what makes sense for the implementation. In one embodiment, a three-month data store is maintained from which trends may be determined.

Note that the granularity of the system informs the system of trends to which it can respond. For example, in a particular system, hour-by-hour data can be kept. Thus, thread manager 117b could determine, based on historical performance data, how many threads to have active within a given hour. The historical performance data may be only a factor to consider, and may influence whether the system expects traffic to increase or decrease, and how many threads have historically been used. The thread performance accumulator either collects statistical and performance data, and/or works in conjunction with another entity that collects data.

Thread manager 117b may keep or have access to a data table or other data store/cache that includes information regarding the threads of thread pool 117a. In at least one embodiment, when a thread gets released, it updates data in the data table. A collection module may then collect the information from the table. In at least one embodiment, the statistics engine is an object that collects the information placed in the data table. The threads may indicate to thread manager 117b when they start and stop, and then the collection module can pull the time when the indications are received. The data collection can be at random times, for example, when a thread starts or stops, or can be at scheduled times.

As illustrated in FIG. 4, system 16 also includes event dispatch thread 4005 ("EDT"), which may be, include, or be included in a conventional JVM event dispatch thread, and may be used as described below.

Also as illustrated in FIG. 4, thread pool 117a includes a CoreSwingWorker thread ("CSW") denoted by example as "Thread 4 (CSW)". CSW has at least some of the functionality of a conventional SwingWorker thread ("SW") and works together with EDT but also with thread pool 117a and thread manager 117b.

In at least one embodiment, application 112 and/or GUI 110 invokes CSW instead of SW. This is done by making a request to thread manager 117b, which, possibly contingent on factors described above, invokes CSW. Like SW, CSW can invoke or allocate a background thread, but unlike SW, CSW invokes or allocates a background thread such as "Thread 6 (BGND)" of thread pool 117a as shown in FIG. 4. For example, "Thread 6 (BGND)" may be a network call across medium 20 to retrieve the name of a LUN.

CSW so invokes or allocates by making a request to thread manager 117b, which possibly contingent on factors described above, invokes or allocates the background thread of thread pool 117a. Like SW, CSW also invokes or allocates a "done" thread such as "Thread 3E (done)" in EDT. As with SW, when the background thread invoked or allocated by CSW completes, its results may be used by the "done" method that is run in the EDT thread.

Thus, unlike use of SW, use of CSW is managed by thread manager 117b and thread pool 117a, which provides advantages of thread pooling to functionality associated with SW. Thread manager 117b can deny or delay invocation, allocation, or execution of CSW itself and/or its background thread based on one or more of the factors described above for controlling threads. Note that depending on the implementation, CSW and the background thread may by managed in the same thread pool or in different thread pools or by the same thread manager or by different thread managers, and thread manager 117b may manage one or more other thread pools in addition to pool 117a, e.g., so that thread manager can control which thread pool CSW and/or the background thread is invoked or allocated from.

In general, there may be differing approaches to thread pool usage. In at least one embodiment, threads are accessed in a top-down approach. Thus, when a CSW thread is requested, the system first looks to the top of thread pool 117a for a CSW thread that can be allocated for use. The first non-busy CSW thread in the pool is obtained to perform work. In this manner, CSW threads at the bottom of the pool will remain unused for the longest period of time, allowing them to be closed, if the system resource consumption does not justify keeping them open. As described above, threads can be considered for closing if they are unused for a threshold period of time.

A specific example has the following characteristics. CSW has at least the functionality of SW and largely acts like SW. In CSW, the doInBackground method is called in a separate thread controlled by thread pool 117a (also referred to as "CoreThreadPool") and the "done" method is called in the EDT. To start this, application 112 and/or GUI 110 can call a CoreSwingWorker::start method or call CoreThreadPool::execute. Each CSW runs and is controlled by thread pool 117a which contains a set number of threads waiting being used. By default the start method makes use of the CoreThreadPool but a different thread pool can optionally be set. A CoreNamedRunnable provides the same features as the Runnable interface but also allows the ability to provide a temporary name and thread priority which are set on a thread when run via the CoreThreadPool. The thread priority does not change the actual thread priority but affects when the thread is run relative to other Runnables that are waiting on a PriorityBlockingQueue (CoreThreadPool). CoreThreadPool may be provided as a class that is an implementation of an ExecutorService that executes each submitted task using the java::ThreadPoolExecutor service. This class is a single controlling entity for all threads within an application (e.g., application 112 or GUI 110). Use of this class allows control and tracking of the total number of thread being used in the application. This class also provides the ability to execute any Runnable task in or out of the Event Dispatch thread regardless of the thread that is currently being run in This class handles NamedRunnable instances as well as Runnable. If a NamedRunnable is provided the thread name is changed so that debug information is easier to obtain. In at least one implementation, the name only changes when running the CoreThreadPool thread and the name change will not occur for Runnables that change from a standard thread to the EDT because it is necessary to call the invokeLater method and it is not possible to change the name back. At least in the specific example, thread pools address two different problems: they provide improved performance when executing large numbers of asynchronous tasks, due to reduced per-task invocation overhead, and they provide a means of bounding and managing the resources, including threads, consumed when executing a collection of tasks. Basic statistics are maintained, such as the number of completed tasks Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing threads in displaying data storage system information, the method comprising:
   selecting a thread having a first method for executing a background task for interacting with a data storage system and a second method for use in updating a graphical user interface display based on a result of executing the background task; and
   selecting, from a thread pool, another thread for executing the background task.

2. The method of claim 1, further comprising:
   using the thread pool to manage the number of threads executing.

3. The method of claim 1, further comprising:
   using the thread pool to collect performance and activity information for the other thread.

4. The method of claim 1, wherein the second method executes in an event dispatch thread.

5. The method of claim 1, wherein the thread has at least some of the functionality of a conventional SwingWorker thread.

6. The method of claim 1, further comprising:
   invoking the thread by making a request to a thread manager.

7. The method of claim 1, wherein a network call results from the first method.

8. The method of claim 1, wherein invoking the other thread is contingent on thread pool management.

9. The method of claim 1, wherein invoking the thread is contingent on thread pool management.

10. The method of claim 1, wherein the thread is from another thread pool.

11. The method of claim 1, wherein the other thread is selected from the thread pool in a top-down approach.

12. The method of claim 1, further comprising:
    closing the other thread after the other thread is unused for a threshold period of time.

13. A system for use in managing threads in displaying data storage system information, the system comprising:
- first hardware logic configured to select a thread having a first method for executing a background task for interacting with a data storage system and a second method for use in updating a graphical user interface display based on a result of executing the background task; and
- second hardware logic configured to select, from a thread pool, another thread for executing the background task.

14. The system of claim 13, further comprising:
- third hardware logic configured to use the thread pool to manage the number of threads executing.

15. The system of claim 13, further comprising:
- third hardware logic configured to use the thread pool to collect performance and activity information for the other thread.

16. The system of claim 13, wherein the second method executes in an event dispatch thread.

17. The system of claim 13, wherein the thread has at least some of the functionality of a conventional SwingWorker thread.

18. The system of claim 13, further comprising:
- third hardware logic configured to invoke the thread by making a request to a thread manager.

19. The system of claim 13, wherein a network call results from the first method.

20. The system of claim 13, wherein invoking the other thread is contingent on thread pool management.

* * * * *